United States Patent
Larson et al.

(10) Patent No.: US 10,323,777 B2
(45) Date of Patent: Jun. 18, 2019

(54) PIPE COUPLING FITTING WITH INTERNAL SPACER SLEEVE

(71) Applicant: A. Y. McDonald Mfg. Co., Dubuque, IA (US)

(72) Inventors: Ryan F. Larson, Dubuque, IA (US); Sebastian Yaklin, Dubuque, IA (US); Thomas W. Hast, Dubuque, IA (US)

(73) Assignee: A.Y. McDonald Mfg. Co., Dubuque, IA (US)

(*) Notice: Subject to any disclaimer, the term of this patent is extended or adjusted under 35 U.S.C. 154(b) by 185 days.

(21) Appl. No.: 15/408,699

(22) Filed: Jan. 18, 2017

(65) Prior Publication Data

US 2018/0202586 A1 Jul. 19, 2018

(51) Int. Cl.
*F16L 19/06* (2006.01)
(52) U.S. Cl.
CPC .................. *F16L 19/061* (2013.01)
(58) Field of Classification Search
USPC ................ 285/371, 341, 342, 343, 340, 354
See application file for complete search history.

(56) References Cited

U.S. PATENT DOCUMENTS

| | | | | |
|---|---|---|---|---|
| 1,615,536 A | * | 1/1927 | Del Mar | F16L 27/1008 285/32 |
| 1,804,856 A | * | 5/1931 | Gustave | F16L 19/075 285/119 |
| 2,162,184 A | * | 6/1939 | Snyder | F16L 19/075 285/341 |
| 2,222,693 A | * | 11/1940 | Thomas, Jr. | F16L 19/06 277/622 |
| 2,503,826 A | * | 4/1950 | Lamont | F16L 19/10 285/340 |
| 2,562,359 A | * | 7/1951 | Iredell, Jr. | F16D 3/76 464/91 |
| 2,761,705 A | * | 9/1956 | Kreidel | F16L 19/12 285/139.2 |
| 2,837,353 A | * | 6/1958 | Ashbrook | F16L 19/06 277/622 |
| 3,135,537 A | * | 6/1964 | Scott | F16L 19/041 285/341 |
| 3,653,688 A | * | 4/1972 | Sakakibara | F16L 17/025 285/105 |

(Continued)

*Primary Examiner* — Aaron M Dunwoody
(74) *Attorney, Agent, or Firm* — Wood, Phillips, Katz, Clark & Mortimer (57) ABSTRACT

A coupling (10) is provided to create a connection between two tubes (12) and includes a first coupling body (14) having an externally threaded end (26), and a second coupling body (16) has an internally threaded end (32) operably engaged with the externally threaded end (28). A first deformable ring (18) is located in the first coupling body (14). A second deformable ring (20) is located in the second coupling body (16). A sleeve (22) is located in the first and second coupling bodies (14,16) extending between the first and second deformable rings (18,20). The coupling (10) has a free condition wherein tubes (12) can be inserted into the coupling (10), and a connecting condition wherein the first and second deformable rings (18,20) are engaged with the sleeve (22) and the first and second coupling bodies (14,16) to be deformed into engagement with any tubes (12) that have been inserted into the coupling (10).

29 Claims, 5 Drawing Sheets

(56) References Cited

U.S. PATENT DOCUMENTS

| | | | | |
|---|---|---|---|---|
| 3,986,730 | A | * | 10/1976 | Martelli ................ F16L 19/075 285/23 |
| 6,145,893 | A | * | 11/2000 | Kuo ....................... F16L 27/12 137/356 |
| 7,699,357 | B2 | * | 4/2010 | Monsen .............. F16L 19/0653 285/243 |
| 2018/0283586 | A1 | * | 10/2018 | Larson ................... F16L 19/12 |

* cited by examiner

Fig. 3

PIPE COUPLING FITTING WITH INTERNAL SPACER SLEEVE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This disclosure relates to fittings used to connect tubing systems, such as pipe, hose, or tubing systems for fluids or gases, or conduit systems for electrical wiring.

BACKGROUND OF THE INVENTION

Conventional compression couplings used for joining two tubes together are typically designed with three parts that thread together, with one of the parts being a left end "nut", another part being a central "body" and a third part being a right end "nut". Typically, both end nuts contain gaskets and internal threads that are threaded onto external threads formed on the central body. To produce these components, four separate threading operations are required in the manufacturing of the three parts, and all three parts must be made of material sufficiently strong to prevent stripping of the threads or other damage to the threads. It would be desirable to reduce the number of threads that must be produced on the parts, as well as to reduce the number of thread engagements that must be manipulated in order to join two tubes via a coupling.

SUMMARY OF THE INVENTION

In accordance with one feature of the invention, a coupling is provided to create a connection between two tubes. The coupling includes a first coupling body having a first tube receiving end, an externally threaded end, and a first tube receiving opening in the first tube receiving end. A second coupling body has a second tube receiving end, an internally threaded end, and a second tube receiving opening in the second tube receiving end. The internally threaded end is operably engaged with the externally threaded end to provide a variable spacing between the first and second tube receiving ends. A first deformable ring is located in the first coupling body. A second deformable ring is located in the second coupling body. A sleeve is located in the first and second coupling bodies extending between the first and second deformable rings. The coupling has a free condition wherein tubes can be inserted through the first and second tube receiving openings to be received in the sleeve, the first tube receiving end being spaced from the second tube receiving end by a first distance in the free condition. A connecting condition is provided wherein the first and second deformable rings are engaged with the sleeve and the first and second coupling bodies to be deformed into engagement with any tubes that have been inserted into the coupling through the first and second tube receiving openings.

The first tube receiving end is spaced from the second tube receiving end by a second distance in the connecting condition, the second distance being less than the first distance.

As one feature, the first and second deformable members are compressed between the sleeve and the first and second coupling bodies in the connecting condition.

In one feature, the first coupling body has a first internal bore extending from the externally threaded end to a first internal shoulder located adjacent the first tube receiving opening. The second coupling body has a second internal bore extending from the internally threaded end to a second internal shoulder located adjacent the second tube receiving opening. The first deformable ring is located adjacent the first internal shoulder for engagement therewith in the connecting condition. The second deformable ring is located adjacent the second internal shoulder for engagement therewith in the connecting condition.

According to one feature, the sleeve includes a first end for engagement with the first deformable ring in the connecting condition, and a second end for engagement with the second deformable ring in the connecting condition.

As one feature, the sleeve includes a first end for engagement with the first deformable ring in the connecting condition, a second end for engagement with the second deformable ring in the connecting condition, and a sleeve bore extending from the first end to the second end.

In one feature, the sleeve further includes a stop located within the sleeve bore, the stop engageable with a tube inserted into the sleeve bore to limit how far the tube can be inserted through either the first or second tube receiving openings.

According to one feature, the stop is an internally facing bump in the sleeve bore midway between the first and second ends of the sleeve.

As one feature, the sleeve bore has a first diameter at the first end and a second diameter at the second end, and wherein the first diameter is equal to the second diameter.

In one feature, the sleeve bore has a first diameter at the first end and a second diameter at the second end, and wherein the first diameter is greater than the second diameter.

According to one feature, the first deformable ring includes an annular gasket that is engageable with the sleeve, the first and second pipe coupling bodies, and any tube inserted into the coupling through the first tube receiving opening to form a fluid tight seal therewith with the coupling in the connecting condition. The second deformable ring includes an annular gasket that is engageable with the sleeve, the first and second pipe coupling bodies, and any tube inserted into the coupling through the second tube receiving opening to form a fluid tight seal therewith with the coupling in the connecting condition.

In one feature, the first deformable ring further includes a first continuity ring, and the second deformable ring further includes a second continuity ring.

As one feature, the first deformable ring includes a grip ring that is engageable with the sleeve, the first and second pipe coupling bodies, and any tube inserted into the coupling through the first tube receiving opening with the coupling in the connecting condition. The second deformable ring includes a grip ring that is engageable with the sleeve, the first and second pipe coupling bodies, and any tube inserted into the coupling through the second tube receiving opening with the coupling in the connection condition.

According to one feature, the first tube receiving opening is cylindrical and has a first diameter, the second tube receiving opening is cylindrical and has a second diameter that is equal to the first diameter.

As one feature, the first tube receiving opening is cylindrical and has a first diameter, the second tube receiving opening is cylindrical and has a second diameter that is smaller than the first diameter.

In accordance with one feature of the invention, a coupling is provided to create a connection between two tubes. The coupling includes a first coupling body having a first tube receiving end, an externally threaded end, and a first tube receiving opening in the first tube receiving end. A second coupling body has a second tube receiving end, an internally threaded end, and a second tube receiving opening in the second tube receiving end, the internally threaded end operably engaged with the externally threaded end to provide a variable spacing between the first and second tube receiving ends. A first gasket is located in the first coupling body to create a seal between the first coupling body and a tube inserted into the first tube receiving opening. A second gasket is located in the second coupling body to great a seal between the second coupling body and a tube inserted into the second tube receiving opening. A sleeve is located in the first and second coupling bodies extending between the first and second gaskets, the sleeve engageable with the first and second gaskets to create a seal therewith. The coupling has an unsealed condition and a sealed condition. In the unsealed condition, the first tube receiving end is spaced from the second tube receiving end by a first distance and tubes can be inserted through the first and second tube receiving openings to be received in the sleeve. In the sealed condition, the first tube receiving end is spaced from the second tube receiving end by a second distance, and the first and second gaskets are engaged with the sleeve and the first and second coupling bodies to form fluid tight seals with the sleeve, the first and second coupling bodies, and any tubes received in the sleeve. The second distance is less than the first distance.

According to one feature, the first and second gaskets are compressed between the sleeve and the first and second coupling bodies in the sealed condition.

As one feature, the first coupling body has a first internal bore extending from the externally threaded end to a first internal shoulder located adjacent the first tube receiving opening. The second coupling body has a second internal bore extending from the internally threaded end to a second internal shoulder located adjacent the second tube receiving opening. The first gasket is an annular gasket located adjacent the first internal shoulder for engagement therewith in the sealed condition. The second gasket is an annular gasket located adjacent the second internal shoulder for engagement therewith in the sealed condition.

In one feature, the first internal shoulder is an annular shoulder and includes a frustoconical surface that engages a frustoconical surface on the first gasket in the sealed condition. The second internal shoulder is an annular shoulder and includes a frustoconical surface that engages a frustoconical surface on the second gasket in the sealed condition.

According to one feature, the sleeve includes a first end for engagement with the first gasket in the sealed condition, and a second end for engagement with the second gasket in the sealed condition.

As one feature, the first end of the sleeve includes a frustoconical surface that engages a frustoconical surface on the first gasket in the sealed condition, and the second end of the sleeve includes a frustoconical surface that engages a frustoconical surface on the second gasket in the sealed condition.

In one feature, the sleeve includes a first end for engagement with the first gasket in the sealed condition, a second end for engagement with the second gasket in the sealed condition, and a sleeve bore extending from the first end to the second end.

According to one feature, the sleeve further includes a stop located within the sleeve bore, the stop engageable with a tube inserted into the sleeve bore to limit how far the tube can be inserted through either the first or second tube receiving openings.

As one feature, the stop is an inwardly facing bump in the sleeve bore midway between the first and second ends of the sleeve.

In one feature, the sleeve bore has a first diameter at the first end and a second diameter at the second end, and wherein the first diameter is equal to the second diameter.

According to one feature, the sleeve bore has a first diameter at the first end and a second diameter at the second end, and wherein the first diameter is greater than the second diameter.

As one feature, at least one grip ring is located within one of the first and second coupling bodies, the at least one grip ring configured to grip a tube received in the sleeve with the coupling in the sealed condition.

In one feature, a first grip ring is located on an inwardly facing surface of the first gasket, and a second grip ring is located on an inwardly facing surface of the second gasket. Each of the grip rings is configured to grip a tube received in the sleeve with the coupling in the sealed condition.

According to one feature, the first tube receiving opening is cylindrical and has a first diameter, and the second tube receiving opening is cylindrical and has a second diameter that is equal to the first diameter.

As one feature, the first tube receiving opening is cylindrical and has a first diameter, and the second tube receiving opening is cylindrical and has a second diameter that is smaller than the first diameter.

Other objects, features, and advantages of the invention will become apparent from a review of the entire specification, including the appended claims and drawings.

DETAILED DESCRIPTION OF THE PREFERRED EMBODIMENT

With reference to FIGS. 1-5, a coupling 10 is provided to create a connection between two tubes 12. The coupling 10 includes a first coupling body 14, a second coupling body 16, a first deformable ring 18 located in the first coupling body 14, a second deformable ring 20 located in the second coupling body 16, and a sleeve 22 located in the first and second coupling bodies 14 and 16 extending between the first and second deformable rings 18 and 20. It should be understood that as used herein, the terms "tube" and "tubes" are intended to encompass any and all of the following: tubes, hoses, and pipes for use in conveying fluids (liquids and gases), and conduits used in electrical wiring systems.

Figure 1:
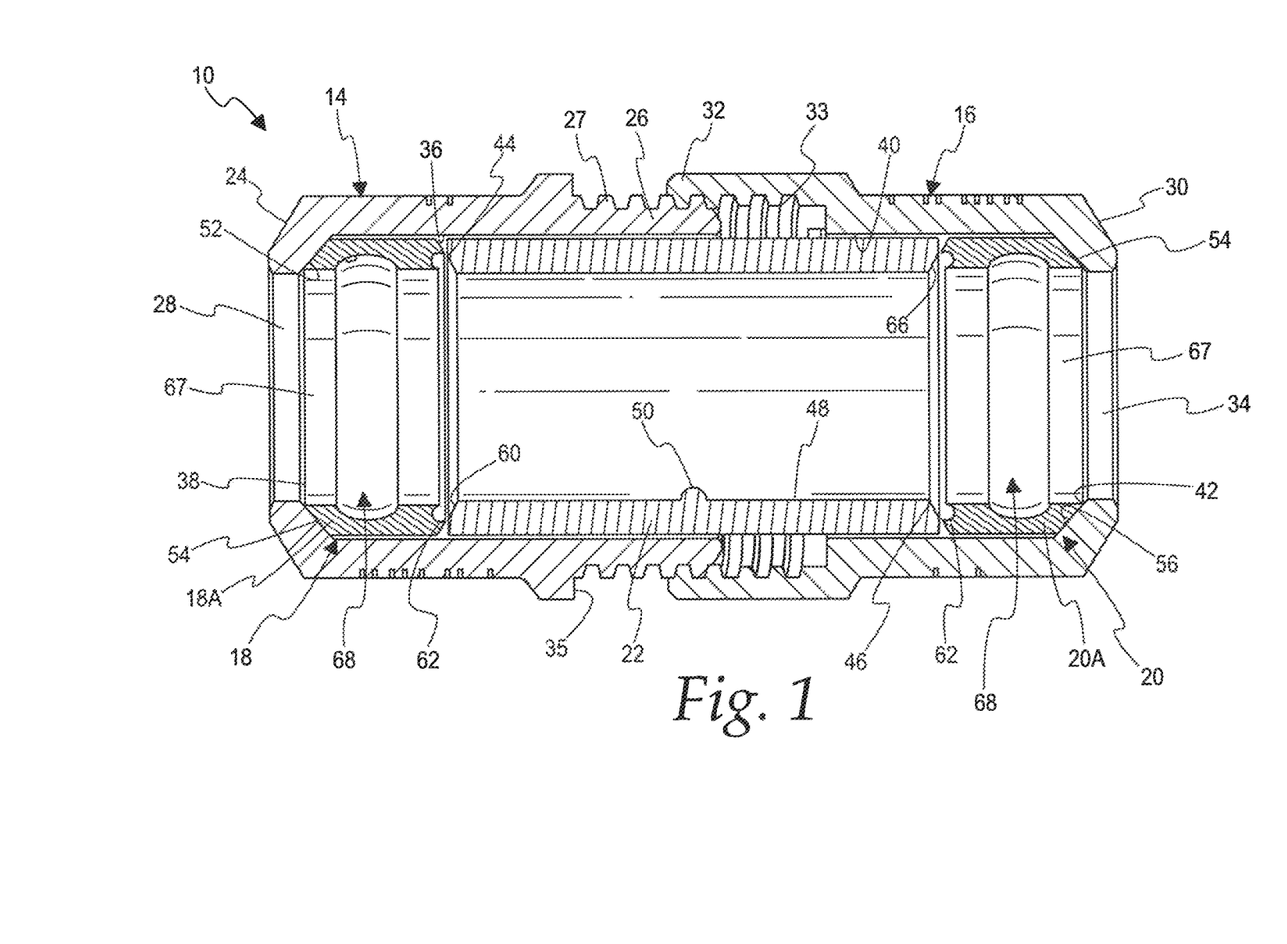
FIG. 1 is a cross-sectional view of an embodiment of a coupling according to the invention with the coupling shown in a free condition and utilizing a first embodiment of deformable rings.
Figure 2:
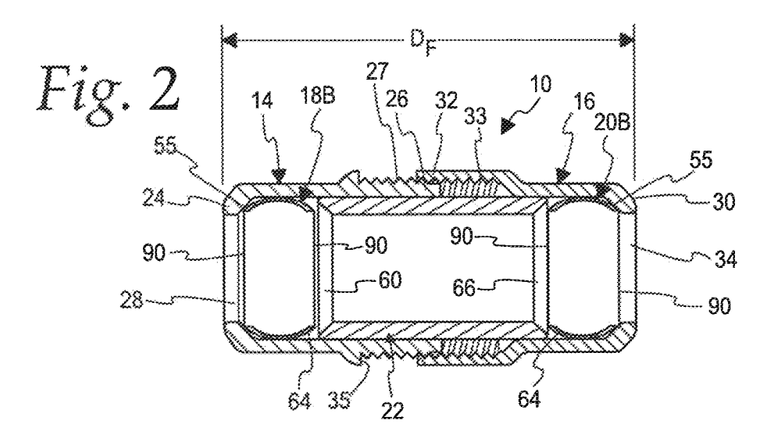
FIG. 2 is a figure similar to FIG. 1, but showing a second embodiment of deformable rings.
Figure 3:
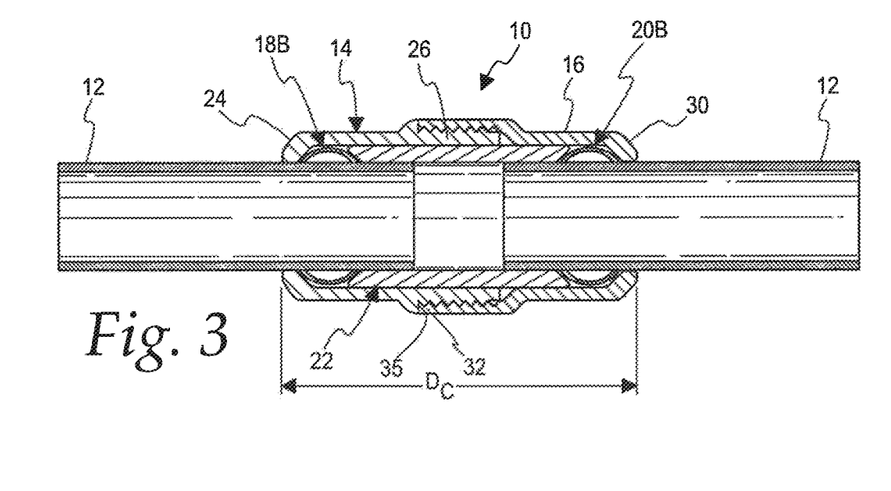
FIG. 3 is a cross-sectional view showing the coupling embodiment of FIG. 2 in a connecting condition wherein a pair of tubes have been connected by the coupling.
Figure 4:
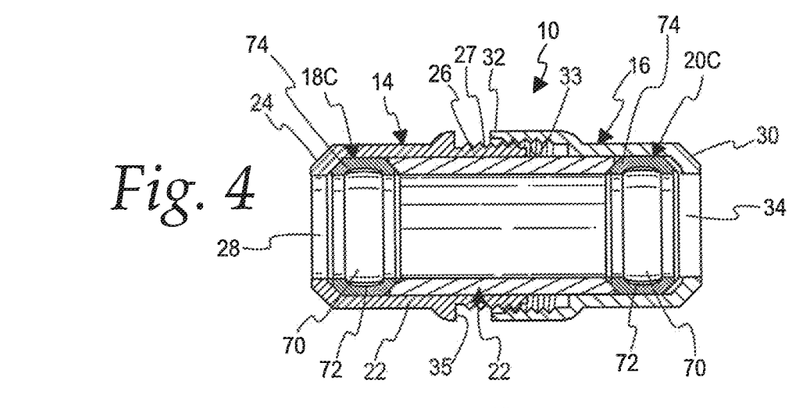
FIG. 4 is a view similar to FIG. 2, but showing a different embodiment of deformable ring in the coupling.
Figure 5:
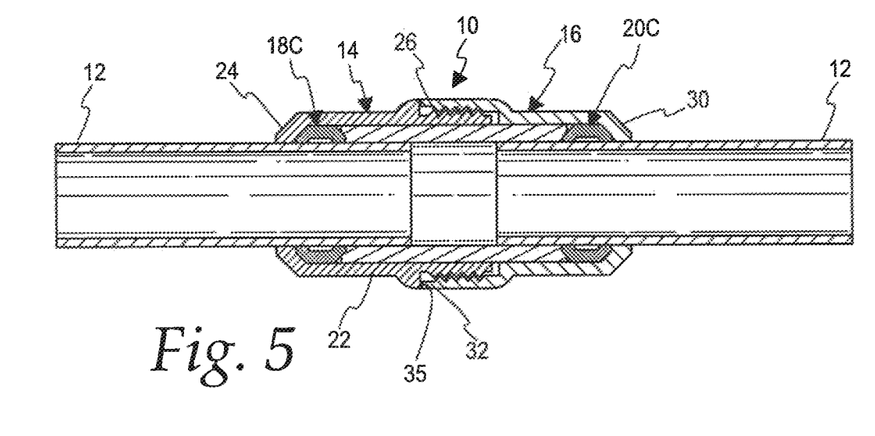
FIG. 5 is a view similar to FIG. 3, but showing the deformable rings of FIG. 4.
Figures 6, 9, 11:
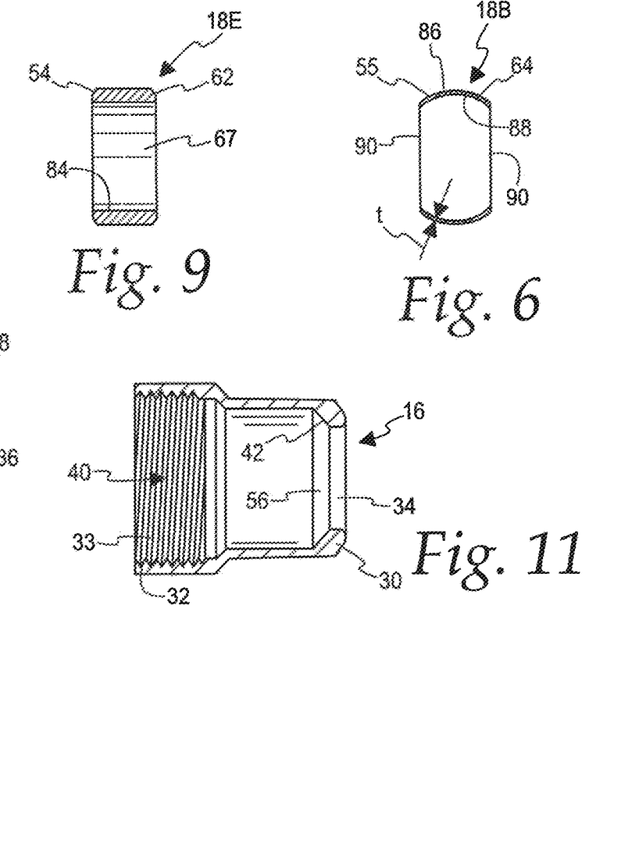
FIG. 6 is a cross-sectional view of one of the deformable ring of FIGS. 2 and 3.
FIG. 9 is a cross-sectional view of yet another embodiment of deformable ring for use with the couplings of the invention.
FIG. 11 is a cross-sectional view of a second coupling body of the couplings of FIGS. 1-5.
Figure 7:
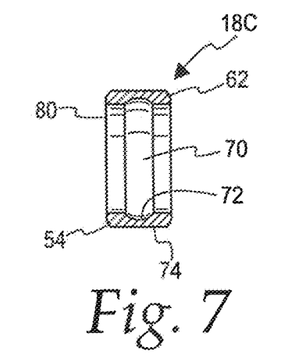
FIG. 7 is a cross-sectional view of the deformable ring of FIGS. 4 and 5.
Figure 8:
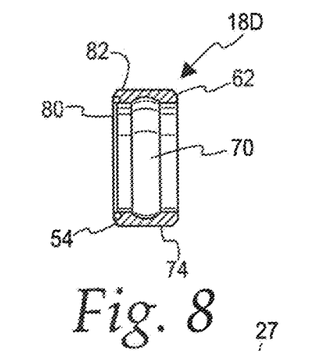
FIG. 8 is a cross-sectional view of another embodiment of deformable ring for use with the couplings according to the invention.

It further should be understood that as used herein, the term "deformable ring" is intended to include a gasket, such as the gaskets 18A and 20A shown in FIG. 1 or the gasket 18E shown in FIG. 9, a grip ring, such as the grip rings 18B and 20B shown in FIGS. 2, 3 and 6, and a combination gasket and grip ring structure, such as the combination gasket/grip rings 18C and 20C shown in FIGS. 4, 5 and 7, a combination gasket, grip ring and continuity ring, such as the combination gasket/grip ring/continuity ring 18D shown in FIG. 8, and any other suitable deformable ring that can be utilized in the coupling to form a structural connection or a sealed connection or an electrical connection or any combination of such connections. It should be appreciated that the deformable rings 20A, 20B and 20C shown in FIGS. 1-5 are mirror images of the corresponding deformable rings 18A, 18B and 18C shown in FIGS. 1-5, and are in fact identical components that are assembled facing in opposite directions within the coupling 10. Similarly, it should be understood that the deformable rings 18B, 18C, 18D and 18E shown in FIGS. 6-9 are representative of the identical component 20B, 20C, 20E (the identical component corresponding to 18D is not shown in the drawings) that would be placed in the coupling 10 facing in an opposite direction.

Figure 10:
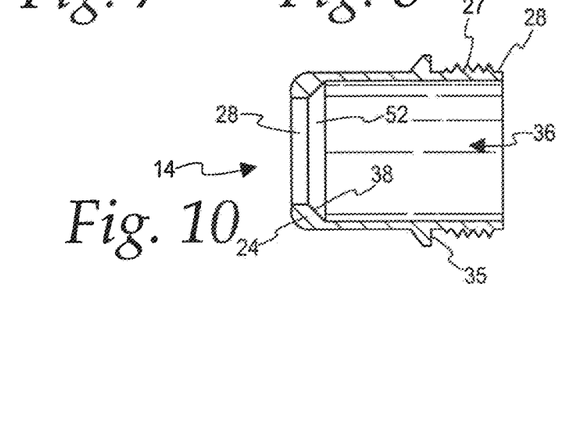
FIG. 10 is a cross-sectional view of a first coupling body of the couplings of FIGS. 1-5.

As best seen in FIG. 10, the first coupling body 14 has a first tube receiving end 24, an externally threaded end 26 with external screw threads 27, and a first tube receiving opening 28 in the first tube receiving end 24. As best seen in FIG. 1, the second coupling body 16 has a second tube receiving end 30, an internally threaded end 32 with internal screw threads 33, and a second tube receiving opening 34 in the second tube receiving end 30. As best seen in FIGS. 1-5, the external threads 27 are engaged with the internal threads 33, with the engagement of the threads allowing a user to vary the spacing between the first and second tube receiving ends 24 and 30 by rotating the first and second coupling bodies 14 and 16 either clockwise or counterclockwise relative to each other. In this regard, the coupling 10 has a free condition shown in FIGS. 1, 2, 4 and 13 wherein the tubes 12 can be inserted through the first and second tube receiving openings 28 and 34 to be received in the sleeve 22, and a connecting condition shown in FIGS. 3, 5 and 14 wherein the first and second deformable rings 18 and 20 are engaged with the sleeve 22 and the first and second coupling bodies 14 and 16 to be deformed into engagement with any tubes 12 that have been inserted into the coupling 10 through the first and second tube receiving openings 28 and 34. With reference to FIGS. 2 and 3, in the free condition, the first tube receiving end 24 is spaced from the second tube receiving end 30 by a first distance $D_F$, and in the connecting condition, the first tube receiving end 24 is spaced from the second tube receiving end 30 by a second distance $D_C$, with the second distance $D_C$ being less than the first distance $D_F$. In the connecting condition, the first and second deformable rings 18 and 20 are compressed between the sleeve 22 and the first and second coupling bodies 14 and 16. In this regard, in the illustrated embodiment, the first coupling body 14 includes a stop surface 35 that is engageable with the end 32 of the second coupling body 16 to restrict the threaded engagement of the screw threads 27 and 33 and to determine a minimum distance for the second distance $D_C$, which in turn limits the amount of compression that can be applied to the deformable rings 18 and 20, as best seen in FIGS. 3 and 5.

As best seen in FIGS. 10 and 11, the first coupling body 14 has an internal bore 36 extending from the externally threaded end 26 to a first annular internal shoulder 38 located adjacent the first tube receiving opening 28, and the second coupling body has a second internal bore 40 extending from the internally threaded end 32 to a second annular internal shoulder 42 located adjacent the second tube receiving opening 30. As best seen in FIGS. 1-5, the deformable ring 18 is located adjacent the first internal shoulder 38 for engagement therewith in the connecting condition, and the second deformable ring 20 is located adjacent the second internal shoulder 42 for engagement therewith in the connecting condition.

Figure 12:
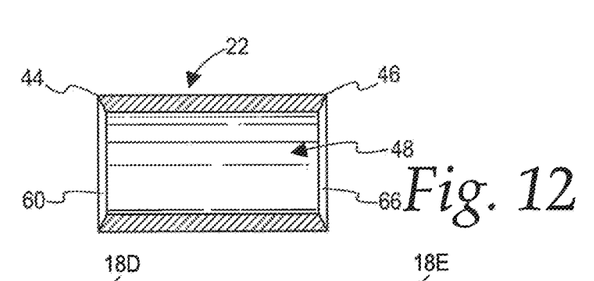
FIG. 12 is a cross-sectional view of a sleeve utilized in the coupling of FIGS. 2-5.

The sleeve 22 includes a first end 44 for engagement with the first deformable ring 18 in the connecting condition, and a second end 46 for engagement with the second deformable ring 20 in the connecting condition. As best seen in FIG. 12, a cylindrical sleeve bore 48 extends from the first end 44 to the second end 46 of the sleeve. As best seen in FIG. 1, a stop 50 can optionally be located within the sleeve bore 48 for engagement with the tubes 12 inserted into the sleeve bore 48 to limit how far each of the tubes 12 can be inserted through either the first or second tube receiving openings 28 and 34. In the illustrated embodiment of FIG. 1, the stop 50 is an internally facing bump 50 in the sleeve bore 48 located midway between the first and second ends 44 and 46 of the sleeve 22. In other embodiments, it is possible for the stop 50 to take other forms, including for the stop 50 to be in the form of a radially inwardly extending annular rib. It should be appreciated that although a preferred form of the sleeve 22 is shown herein, the sleeve 22 may be manufactured with ends that do not include a frustoconical surface.

It should be understood that the sleeve 22 and the coupling bodies 10 and 14 can be made from any suitable material, such as, for example, copper, no lead brass alloy, 85 brass alloy, yellow brass alloy, stainless steel, galvanized steel, cast iron, or any other metal, alloy or combination of metals formed through casting, machining or forging process, or may be made from plastics through injection for a suitable process such as injection molding, or fiberglass or even resin via a suitable process.

In the illustrated embodiments, the internal shoulder 38 includes a frustoconical surface 52 that engages a frustoconical surface 54 on the first gasket 18A,18C,18D,18E or an arcuate surface 55 on the gripper 18B in the connecting condition. The second internal shoulder 42 includes a frustoconical surface 56 that engages a frustoconical surface 54 on the second gasket 20A,20C,20E or an arcuate surface 55 on the gripper 20B in the connecting condition. Similarly, the end 44 of the sleeve 22 includes a frustoconical surface 60 that engages a frustoconical surface 62 on the gasket 18A,18C,18D,18E or an arcuate surface 64 on the gripper 18B, and the second end 46 of the sleeve 22 includes a frustoconical surface 66 that engages a frustoconical surface 62 on the gasket 20A,20C,20E or an arcuate surface 64 on the gripper 20B in the connecting condition. It should be understood that the shapes of these surfaces assist in compressing the deformable rings 18 and 20 in a radially inwardly direction so that they engage the cylindrical outer surface of each of the tubes 12 to form a seal therewith or to form a structural/mechanical engagement therewith or to form an electrically conductive connection therewith or to form some combination of the foregoing.

The gaskets 18A and 20A shown in FIG. 1 include a cylindrical bore 67 extending through each of the gaskets 18 and 20A and interrupted by a centrally located concave, annular groove 68. The body of the gaskets 18A and 20A can be made from any suitable gasket material, such as a suitable elastomer or other material.

The combination gasket/grip ring 18 shown in FIGS. 4, 5 and 7 have a grip ring 70 mounted on an inwardly facing surface 72 of the gasket body 74. In the illustrated embodiment, the gasket body 74 is identical to the gaskets 18A and 20A, and accordingly, the surface 72 is defined by the concave annular groove 68 that conforms to the convex shape of the outer surface of the grip ring 70. The compression forces on the frustoconical surfaces 54 and 62 are transferred through the material of the gasket body 74 to the grip ring 70 so that the grip ring 70 is also compressed against a tube 12 received in the combination gasket/grip ring 18G.

The combination gasket/grip ring/continuity ring 18D shown in FIG. 8 is identical to that of FIG. 7, with the exception that a continuity ring 80 has been added and is received in a conforming annular groove 82 formed in the gasket body 74. The continuity ring 80 is compressed together with the remainder of the combination gasket/grip ring/continuity ring 18D into engagement with any tube 12 received therein and serves to create an electrically conductive path between the tube 12 and the remainder of the coupling 10.

The gasket 18E shown in FIG. 9 is similar to the gasket 18A shown in FIG. 1, with the exception that the gasket 18E of FIG. 9 has an inwardly facing cylindrical surface 84 that is not interrupted by an annular groove.

The grip ring 18B,20B shown in FIGS. 2, 3 and 6 has an arcuate outer surface 86 that is convex in shape and an arcuate inner surface 88 that is concave in shape and separated from the outer surface 86 by uniform material thickness t. The shape of the grip ring 18B,20B defines edges 90 at both axial ends of the grip ring 18B,20B that engage the outer surface of any tube 12 that is inserted into the grip ring 18B,20B when the grip ring 18B,20B is compressed by the coupling 10 in the connecting condition. It should be appreciated that the grip rings 70 shown in FIGS. 4, 5 and 7 are essentially identical in shape to the grip ring 18B shown in FIG. 6, but are scaled down in size so as to fit within the gasket body 74.

The gasket body 74 can be made from any suitable gasket material, such as a suitable elastomer, and the grip rings 18B, 20B and 70 can be made from any suitable performable material, such as a suitable metal. It should be appreciated that while specific forms of deformable rings 18 and 20 have been shown herein, any suitable deformable ring can be used within the coupling 10 according to the invention.

Figure 13:
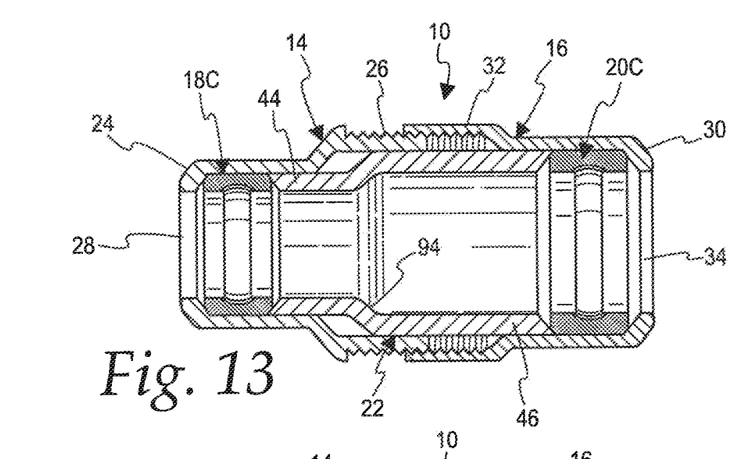
FIG. 13 is a cross-sectional view of another embodiment of the coupling in a free condition wherein different diameters of tubes can be connected according to the invention.
Figure 14:
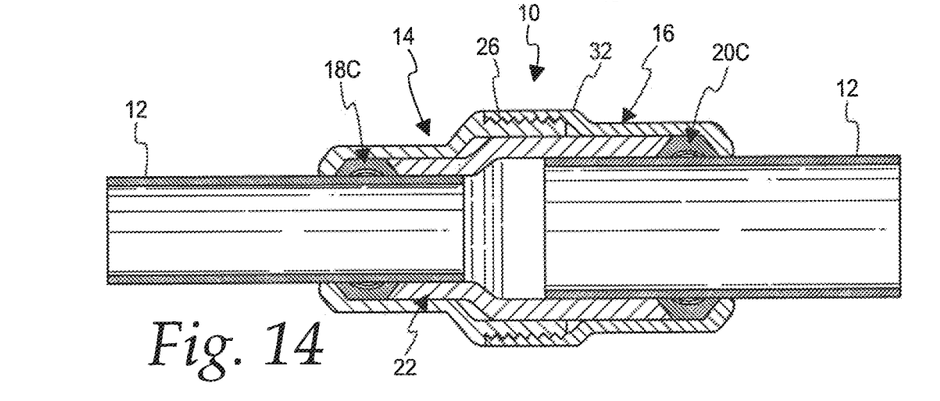
FIG. 14 is a cross-sectional view of the coupling of FIG. 13, showing the coupling in a connecting condition wherein tubes of different diameter have been connected with the coupling.

The coupling 10 shown in FIGS. 13 and 14 is identical to the coupling 10 shown in FIGS. 1-11, with the exception that it is designed to connect a tube 12 in the first coupling body 14 that has a smaller diameter than a tube 12 received in the second coupling body 16. Thus, the diameter of the first tube received opening 28 is smaller than the diameter of the second tube receiving opening 34, the inside diameter of the deformable ring 18 is smaller than the inside diameter of the deformable ring 20, the inside diameter of the sleeve 22 at the first end 44 is smaller than the inside diameter of the sleeve 22 at the second end 46, and the sleeve 22 has an annular shoulder 94 to accommodate the different diameters at each end of the sleeve 22. It should be appreciated that any of the deformable rings disclosed herein can be utilized in the coupling 10 shown in FIGS. 13 and 14.

It should be appreciated that the coupling 10 disclosed herein is scalable and may be increased in size or reduced in size to fit any diameter or material type of tube 12. It should be further understood that the length of one or both of the coupling bodies 14 and 16 may be increased or decreased for applications where the tubes 12 being joined are separated by a larger or smaller gap or are unable to moved closer or further apart.

It should be appreciated that the coupling 10 disclosed herein reduces the number of components in comparison to conventional compression-type couplings, and reduces the number of thread machine operations in comparison to conventional compression couplings.

The invention claimed is:

1. A coupling to create a connection between two tubes, the coupling comprising:
   a first coupling body having a first tube receiving end, an externally threaded end, and a first tube receiving opening in the first tube receiving end;
   a second coupling body having a second tube receiving end, an internally threaded end, and a second tube receiving opening in the second tube receiving end, the internally threaded end operably engaged with the externally threaded end to provide a variable spacing between the first and second tube receiving ends;
   a first deformable ring located in the first coupling body
   a second deformable ring located in the second coupling body; and
   a sleeve located in the first and second coupling bodies extending between the first and second deformable rings;
   wherein the coupling has:
   a free condition wherein tubes can be inserted through the first and second tube receiving openings to be received in the sleeve, the first tube receiving end being spaced from the second tube receiving end by a first distance in the free condition; and
   a connecting condition wherein the first and second deformable rings are engaged with the sleeve and the first and second coupling bodies to be deformed into engagement with any tubes that have been inserted into the coupling through the first and second tube receiving openings, the first tube receiving end being spaced from the second tube receiving end by a second distance in the connecting condition, the second distance being less than the first distance;

wherein the first coupling body has a radially extending outer shoulder and the second coupling body has an end shoulder extending radially at the internally threaded end, said second coupling body end shoulder abutting said first coupling body radially extending outer shoulder in said connection condition when a selected maximum compression is applied to said first and second deformable rings.

2. The coupling of claim 1 wherein the first and second deformable members are compressed between the sleeve and the first and second coupling bodies in the connecting condition.

3. The coupling of claim 2 wherein:
the first coupling body has a first internal bore extending from the externally threaded end to a first internal shoulder located adjacent the first tube receiving opening;
the second coupling body has a second internal bore extending from the internally threaded end to a second internal shoulder located adjacent the second tube receiving opening;
the first deformable ring is located adjacent the first internal shoulder for engagement therewith in the connecting condition; and
the second deformable ring is located adjacent the second internal shoulder for engagement therewith in the connecting condition.

4. The coupling of claim 3 wherein the sleeve includes a first end for engagement with the first deformable ring in the connecting condition, and a second end for engagement with the second deformable ring in the connecting condition.

5. The coupling of claim 1 wherein the sleeve includes:
a first end for engagement with the first deformable ring in the connecting condition;
a second end for engagement with the second deformable ring in the connecting condition; and
a sleeve bore extending from the first end to the second end.

6. The coupling of claim 5 wherein the sleeve further includes a stop located within the sleeve bore, the stop engageable with a tube inserted into the sleeve bore to limit how far the tube can be inserted through either the first or second tube receiving openings.

7. The coupling of claim 6 wherein the stop is an internally facing bump in the sleeve bore midway between the first and second ends of the sleeve.

8. The coupling of claim 5 wherein the sleeve bore has a first diameter at the first end and a second diameter at the second end, and wherein the first diameter is equal to the second diameter.

9. The coupling of claim 5 wherein the sleeve bore has a first diameter at the first end and a second diameter at the second end, and wherein the first diameter is greater than the second diameter.

10. The coupling of claim 1 wherein:
the first deformable ring comprises an annular gasket that is engageable with the sleeve, the first and second pipe coupling bodies, and any tube inserted into the coupling through the first tube receiving opening to form a fluid tight seal therewith with the coupling in the connecting condition; and
the second deformable ring comprises an annular gasket that is engageable with the sleeve, the first and second pipe coupling bodies, and any tube inserted into the coupling through the second tube receiving opening to form a fluid tight seal therewith with the coupling in the connecting condition.

11. The coupling of claim 10 wherein the first deformable ring further comprises a first continuity ring, and the second deformable ring further comprises a second continuity ring.

12. The coupling of claim 1 wherein:
the first deformable ring comprises a grip ring that is engageable with the sleeve, the first and second pipe coupling bodies, and any tube inserted into the coupling through the first tube receiving opening with the coupling in the connecting condition; and
the second deformable ring comprises a grip ring that is engageable with the sleeve, the first and second pipe coupling bodies, and any tube inserted into the coupling through the second tube receiving opening with the coupling in the connection condition.

13. The coupling of claim 1 wherein the first tube receiving opening is cylindrical and has a first diameter, the second tube receiving opening is cylindrical and has a second diameter that is equal to the first diameter.

14. The coupling of claim 1 wherein the first tube receiving opening is cylindrical and has a first diameter, the second tube receiving opening is cylindrical and has a second diameter that is smaller than the first diameter.

15. A coupling to create a connection between two tubes, the coupling comprising:
a first coupling body having a first tube receiving end, an externally threaded end, and a first tube receiving opening in the first tube receiving end;
a second coupling body having a second tube receiving end, an internally threaded end, and a second tube receiving opening in the second tube receiving end, the internally threaded end operably engaged with the externally threaded end to provide a variable spacing between the first and second tube receiving ends;
a first gasket located in the first coupling body to create a seal between the first coupling body and a tube inserted into the first tube receiving opening;
a second gasket located in the second coupling body to great a seal between the second coupling body and a tube inserted into the second tube receiving opening; and
a sleeve located in the first and second coupling bodies extending between the first and second gaskets, the sleeve engageable with the first and second gaskets to create a seal therewith;
wherein the coupling has:
an unsealed condition wherein tubes can be inserted through the first and second tube receiving openings to be received in the sleeve, the first tube receiving end being spaced from the second tube receiving end by a first distance in the unsealed condition; and
a sealed condition wherein the first and second gaskets are engaged with the sleeve and the first and second coupling bodies to form fluid tight seals with the sleeve, the first and second coupling bodies, and any tubes received in the sleeve, the first tube receiving end being spaced from the second tube receiving end by a second distance in the sealed condition, the second distance being less than the first distance; and
wherein the first coupling body has a radially extending outer shoulder and the second coupling body has an end shoulder extending radially at the internally threaded end, said second coupling body end shoulder abutting said first coupling body radially extending outer shoulder in said connection condition when a selected maximum compression is applied to said first and second deformable rings.

16. The coupling of claim 15 wherein the first and second gaskets are compressed between the sleeve and the first and second coupling bodies in the sealed condition.

17. The coupling of claim 16 wherein:
the first coupling body has a first internal bore extending from the externally threaded end to a first internal shoulder located adjacent the first tube receiving opening;
the second coupling body has a second internal bore extending from the internally threaded end to a second internal shoulder located adjacent the second tube receiving opening;
the first gasket is an annular gasket located adjacent the first internal shoulder for engagement therewith in the sealed condition; and
the second gasket is an annular gasket located adjacent the second internal shoulder for engagement therewith in the sealed condition.

18. The coupling of claim 17 wherein:
the first internal shoulder is an annular shoulder and includes a frustoconical surface that engages a frustoconical surface on the first gasket in the sealed condition; and
the second internal shoulder is an annular shoulder and includes a frustoconical surface that engages a frustoconical surface on the second gasket in the sealed condition.

19. The coupling of claim 17 wherein the sleeve includes a first end for engagement with the first gasket in the sealed condition, and a second end for engagement with the second gasket in the sealed condition.

20. The coupling of claim 19 wherein the first end of the sleeve includes a frustoconical surface that engages a frustoconical surface on the first gasket in the sealed condition, and the second end of the sleeve includes a frustoconical surface that engages a frustoconical surface on the second gasket in the sealed condition.

21. The coupling of claim 15 wherein the sleeve includes:
a first end for engagement with the first gasket in the sealed condition;
a second end for engagement with the second gasket in the sealed condition; and
a sleeve bore extending from the first end to the second end.

22. The coupling of claim 21 wherein the sleeve further includes a stop located within the sleeve bore, the stop engageable with a tube inserted into the sleeve bore to limit how far the tube can be inserted through either the first or second tube receiving openings.

23. The coupling of claim 22 wherein the stop is an inwardly facing bump in the sleeve bore midway between the first and second ends of the sleeve.

24. The coupling of claim 21 wherein the sleeve bore has a first diameter at the first end and a second diameter at the second end, and wherein the first diameter is equal to the second diameter.

25. The coupling of claim 21 wherein the sleeve bore has a first diameter at the first end and a second diameter at the second end, and wherein the first diameter is greater than the second diameter.

26. The coupling of claim 15 further comprising at least one grip ring located within one of the first and second coupling bodies, the at least one grip ring configured to grip a tube received in the sleeve with the coupling in the sealed condition.

27. The coupling of claim 15 further comprising:
a first grip ring located on an inwardly facing surface of the first gasket; and
a second grip ring located on an inwardly facing surface of the second gasket;
each of the grip rings configured to grip a tube received in the sleeve with the coupling in the sealed condition.

28. The coupling of claim 15 wherein the first tube receiving opening is cylindrical and has a first diameter, the second tube receiving opening is cylindrical and has a second diameter that is equal to the first diameter.

29. The coupling of claim 15 wherein the first tube receiving opening is cylindrical and has a first diameter, the second tube receiving opening is cylindrical and has a second diameter that is smaller than the first diameter.

* * * * *